July 27, 1954　　　C. A. LEE　　　2,684,690
FLOW CONTROL APPARATUS
Filed Oct. 1, 1949　　　10 Sheets-Sheet 1
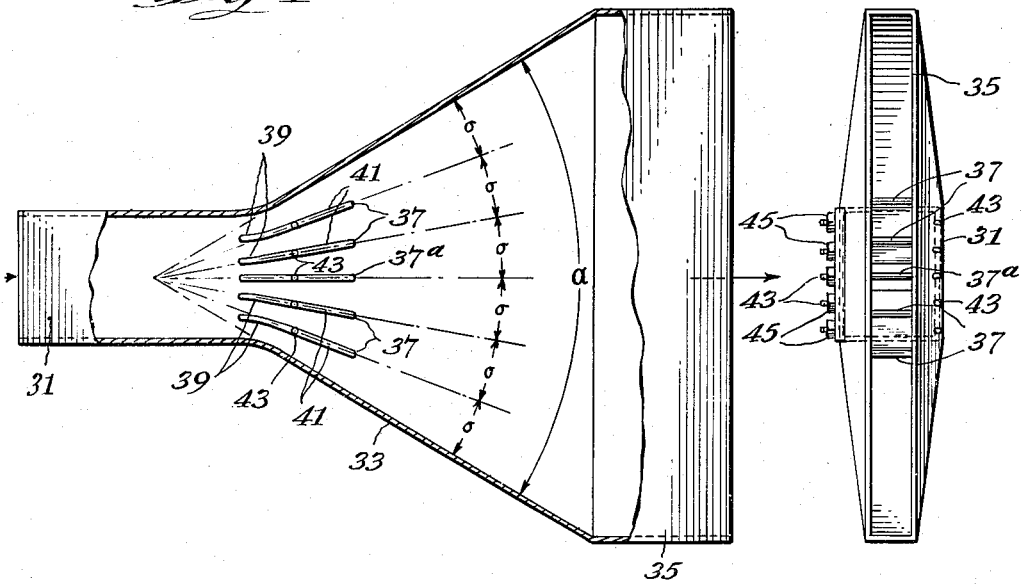
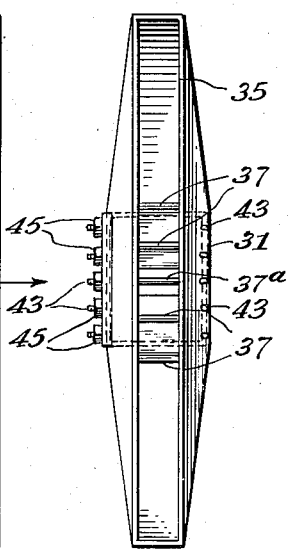
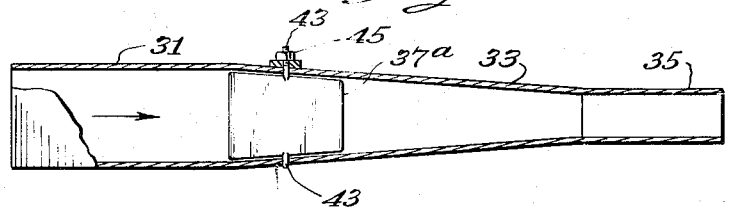
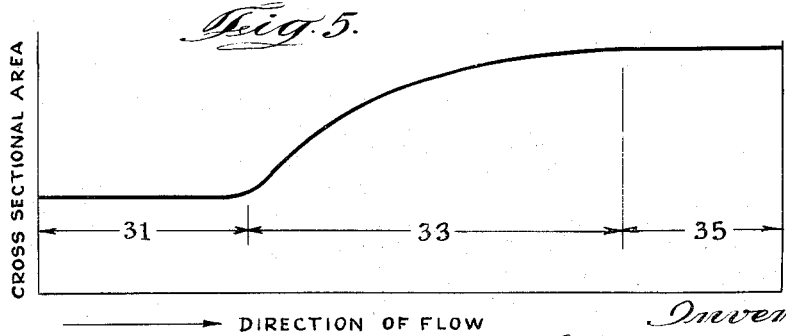
Inventor
Charles A. Lee
By Doane, Pond & Anderson
Attorneys July 27, 1954     C. A. LEE     2,684,690
FLOW CONTROL APPARATUS
Filed Oct. 1, 1949     10 Sheets-Sheet 2
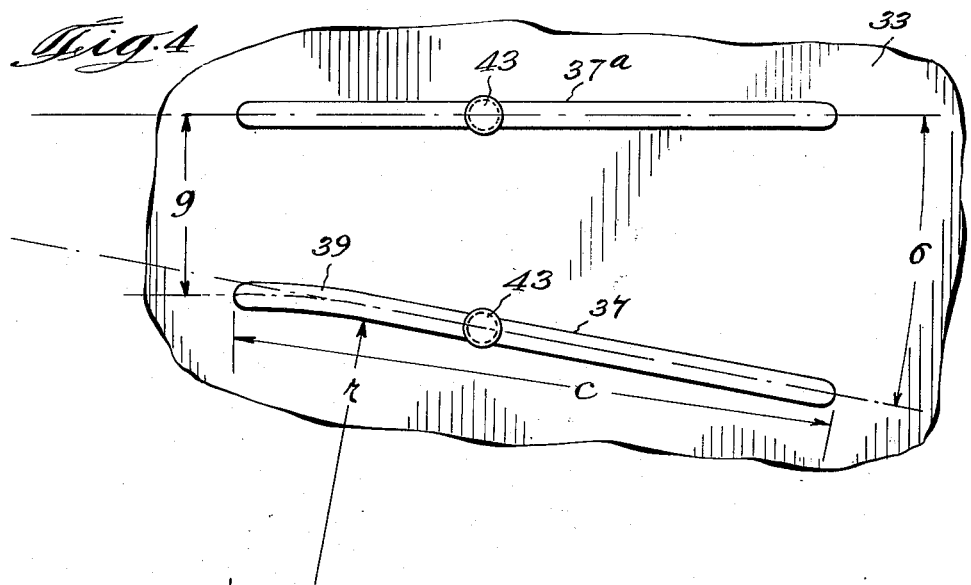
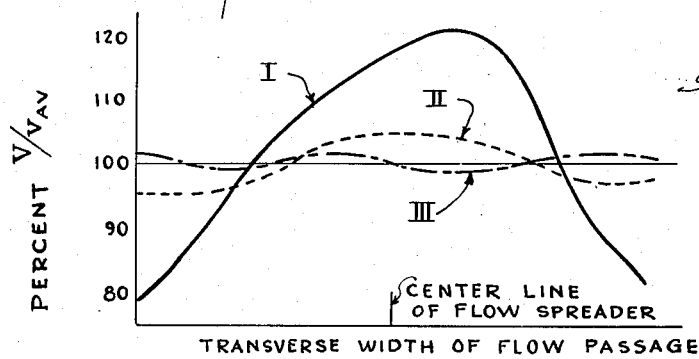
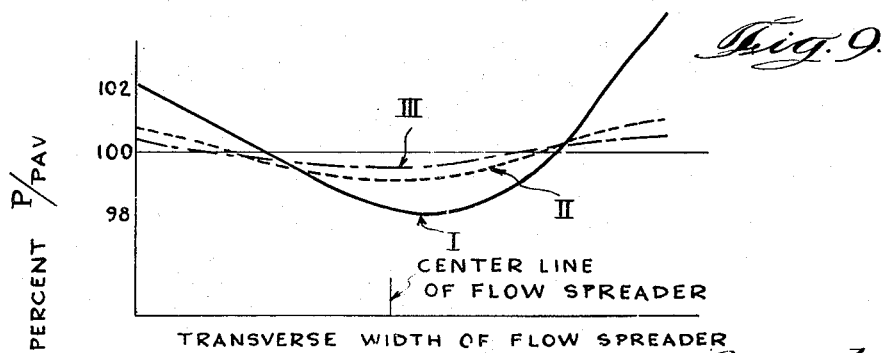
Inventor
Charles A. Lee
By Soans, Pond & Anderson
Attorneys

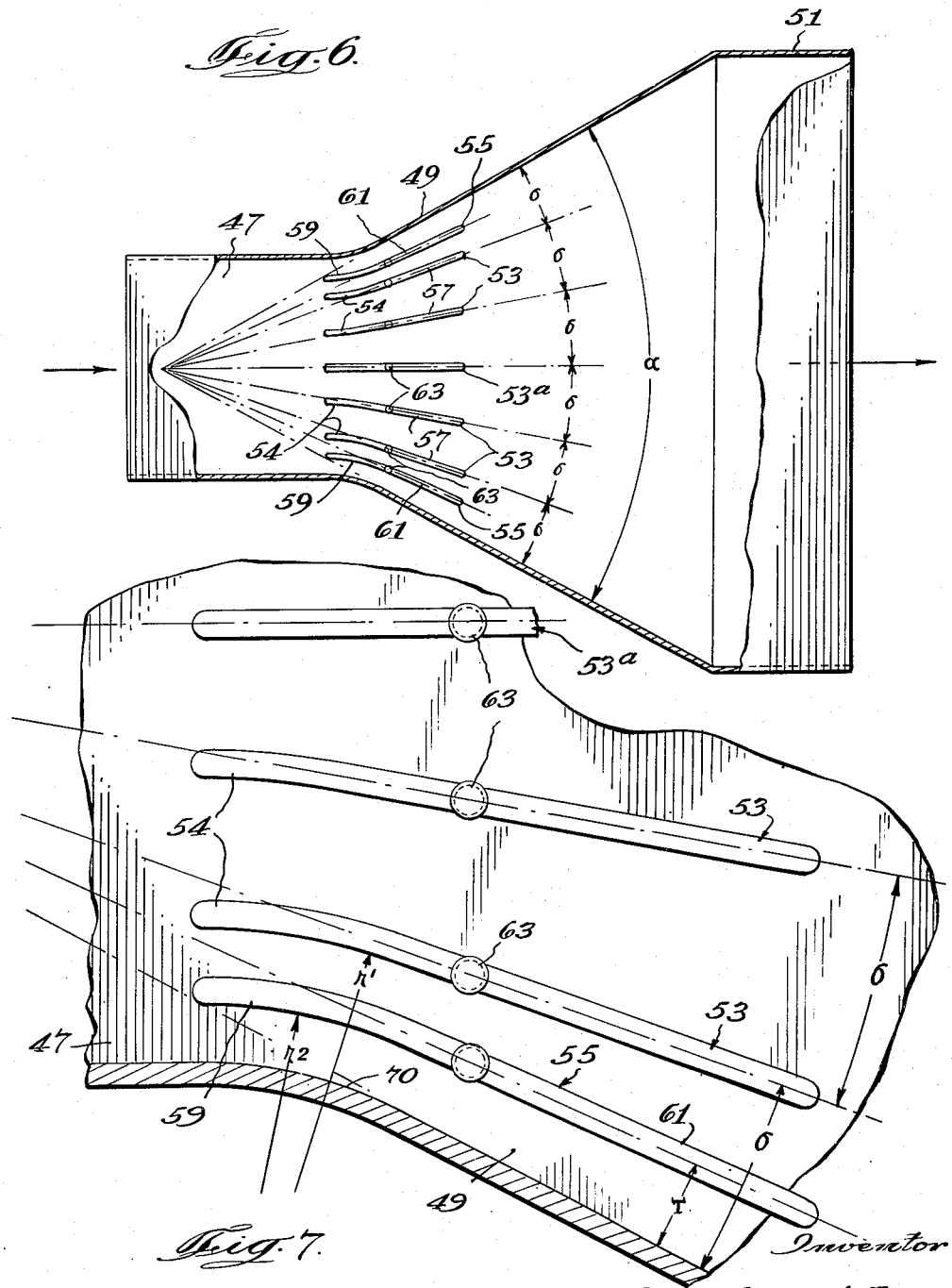

July 27, 1954  C. A. LEE  2,684,690
FLOW CONTROL APPARATUS
Filed Oct. 1, 1949  10 Sheets-Sheet 4

Inventor
Charles A. Lee
By Soans, Pond & Anderson
Attorneys

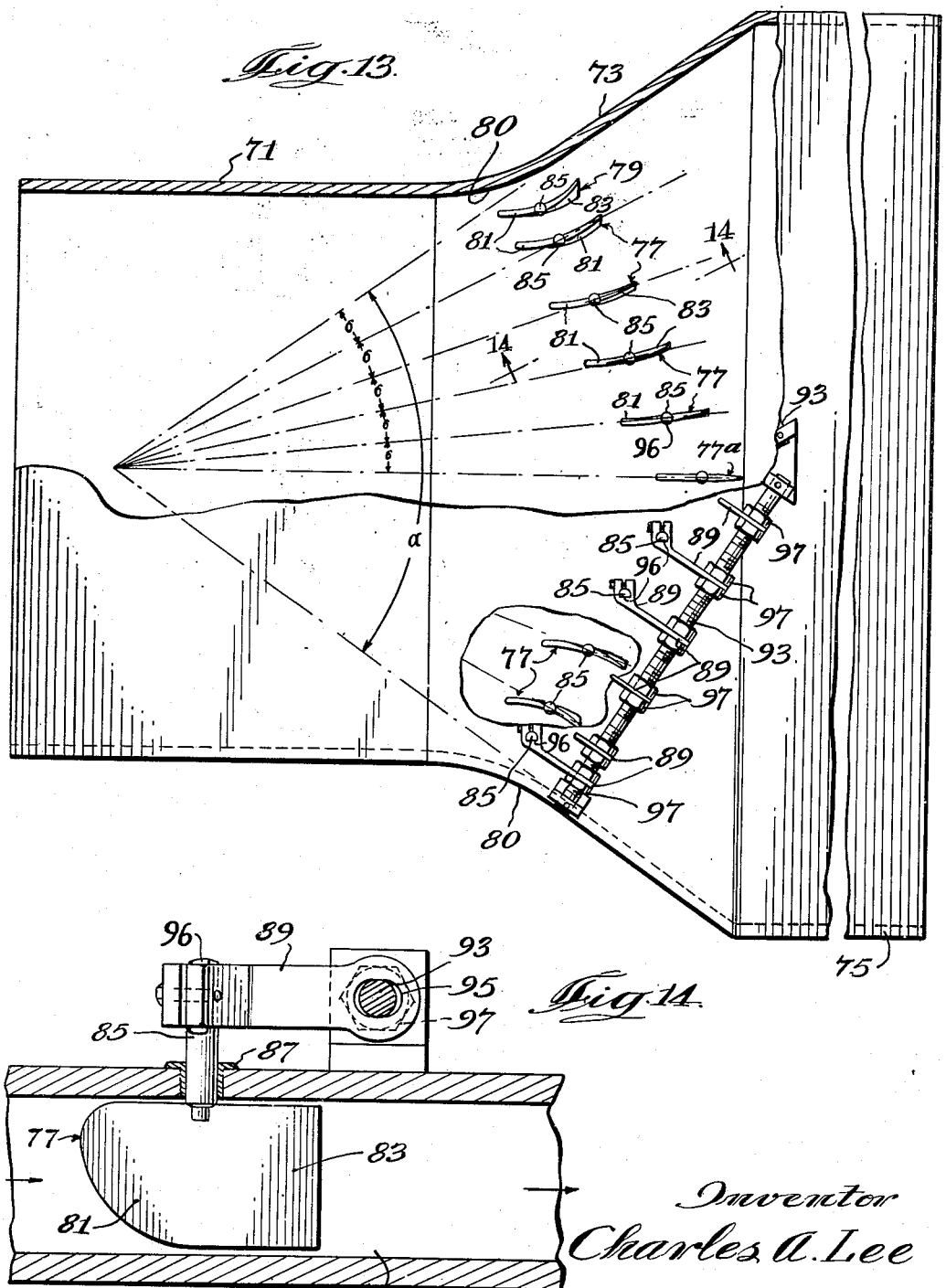

July 27, 1954  C. A. LEE  2,684,690
FLOW CONTROL APPARATUS
Filed Oct. 1, 1949  10 Sheets-Sheet 6

Inventor
Charles A. Lee
By Soans, Pond & Anderson
Attorneys

July 27, 1954 C. A. LEE 2,684,690
FLOW CONTROL APPARATUS
Filed Oct. 1, 1949 10 Sheets-Sheet 7
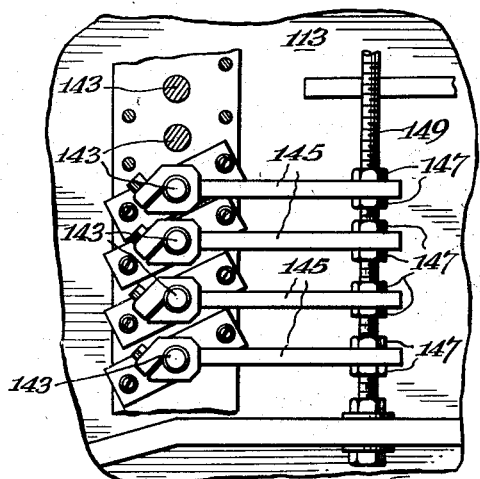
Fig. 20.
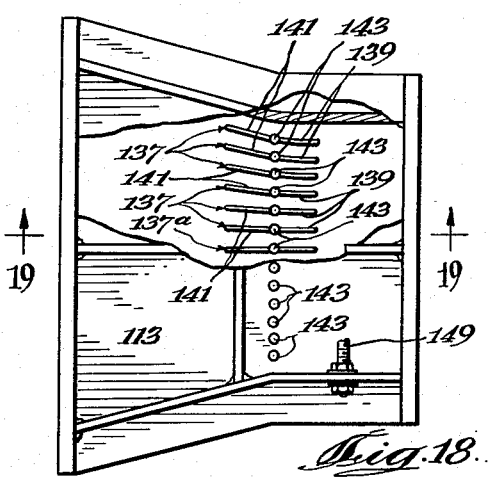
Fig. 18.
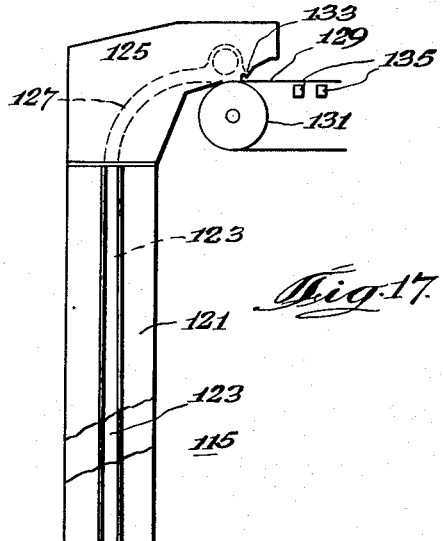
Fig. 17.
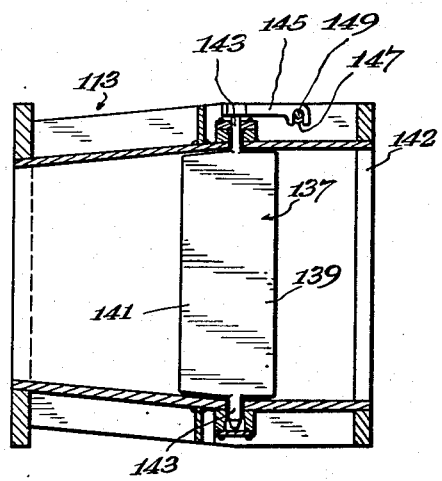
Fig. 19.
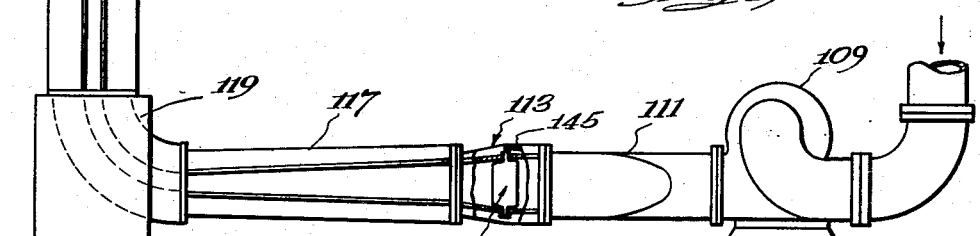
Inventor
Charles A. Lee
By Doane, Pond & Anderson
Attorneys July 27, 1954
C. A. LEE
2,684,690
FLOW CONTROL APPARATUS
Filed Oct. 1, 1949
10 Sheets-Sheet 8
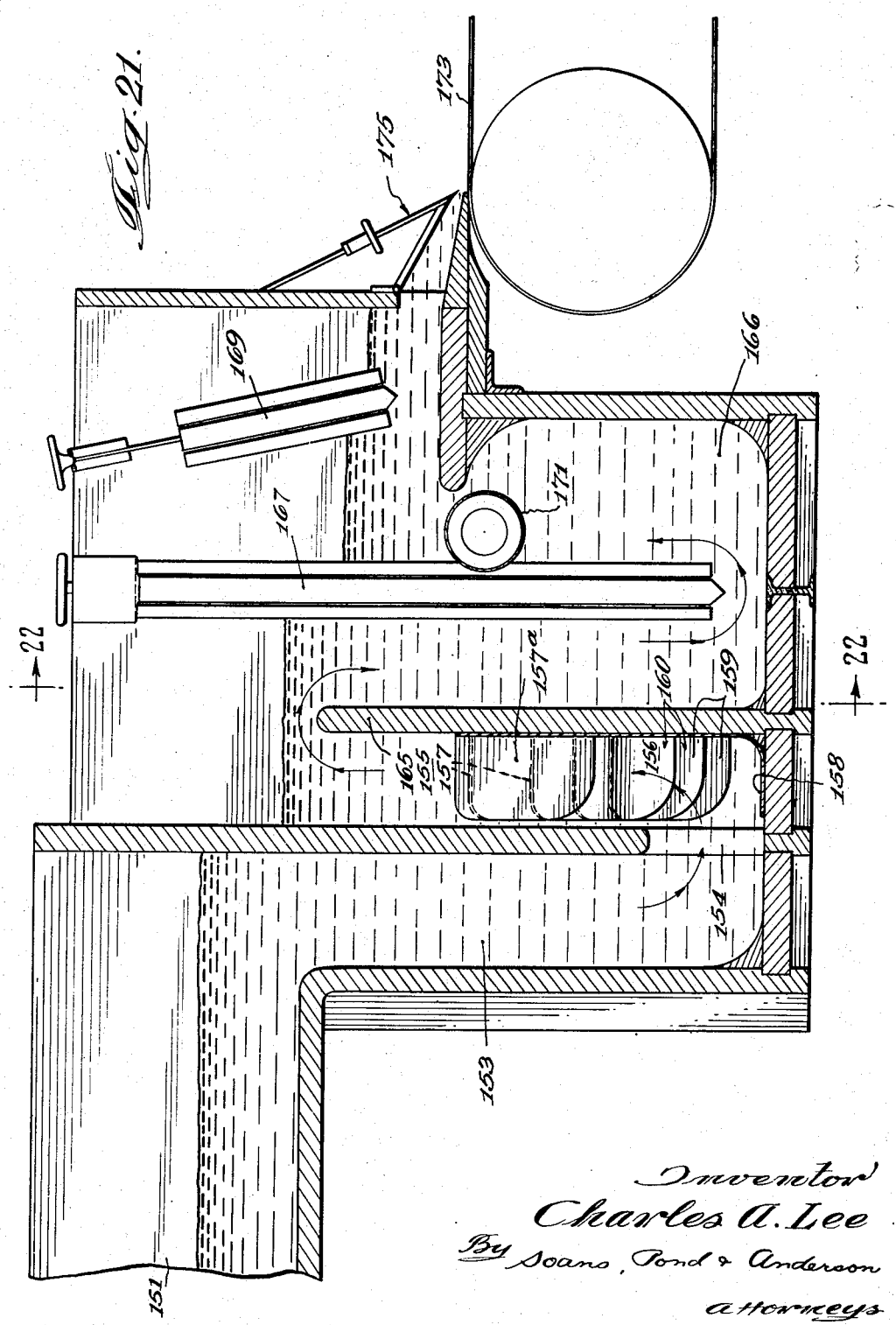
Inventor
Charles A. Lee
By Soans, Pond & Anderson
Attorneys Inventor
Charles A. Lee
By Soans, Pond & Anderson
Attorneys July 27, 1954
C. A. LEE
2,684,690
FLOW CONTROL APPARATUS
Filed Oct. 1, 1949
10 Sheets-Sheet 10
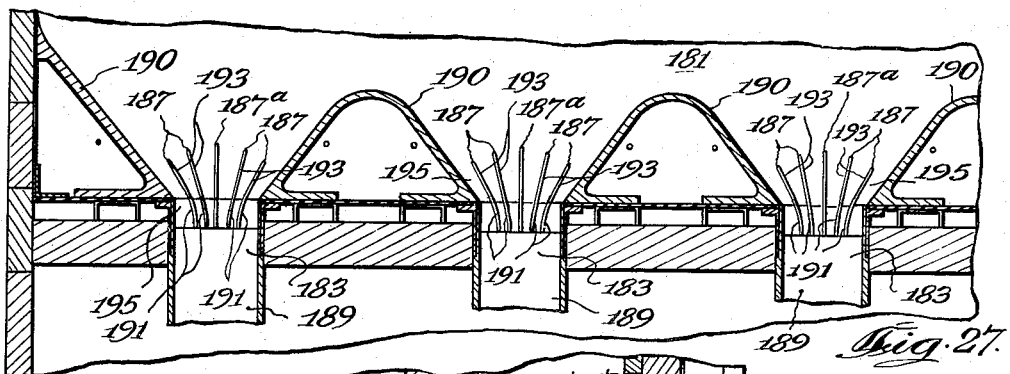
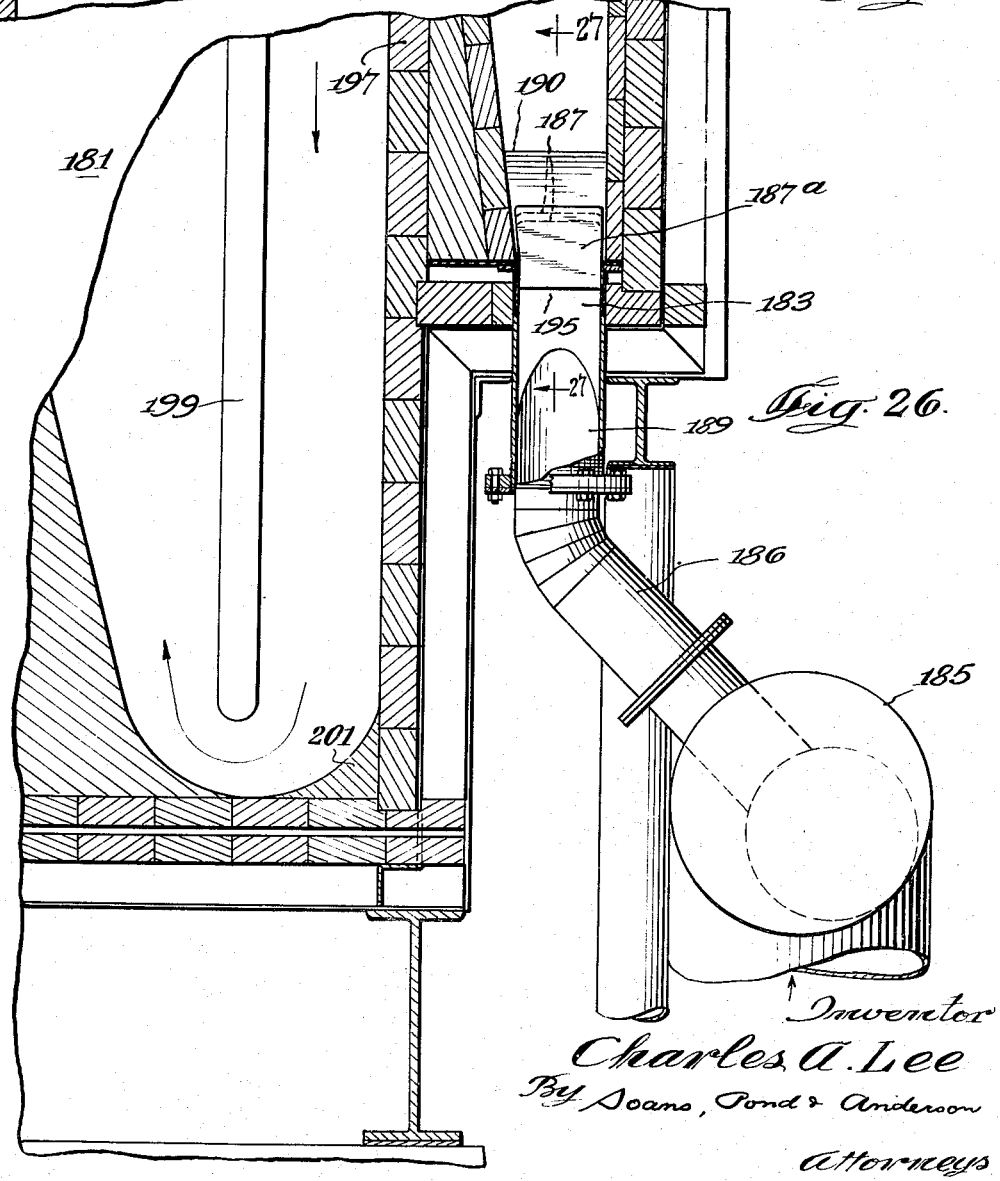
Inventor
Charles A. Lee
By Doane, Pond & Anderson
Attorneys Patented July 27, 1954

2,684,690

UNITED STATES PATENT OFFICE 2,684,690

FLOW CONTROL APPARATUS

Charles A. Lee, Neenah, Wis., assignor to Paper Patents Company, Neenah, Wis., a corporation of Wisconsin Application October 1, 1949, Serial No. 119,140

14 Claims. (Cl. 137—599)

1

The present invention relates, in its broader aspects, to the control of flowing streams of liquids and gases. More particularly, the invention relates to the control of flowing streams of liquids and gases which have fibers and other materials suspended or dispersed therein, and which may be contained in closed conduits. Generally stated, the principal object of the invention is to provide improved flow control means for such uses.

The control of flowing streams of liquids and gases, and especially flowing streams of liquids and gases which contain fiber and other suspensions or dispersions, is of great importance in various arts. For example, in the operation of paper making machines of various types, and particularly Fourdrinier machines, it is necessary to deliver the fiber-containing liquid stock from which the paper is manufactured to the web-forming region of the machine in the form of a wide and relatively shallow, flowing stream of rectangular cross section, which may be under considerable pressure. Also in such machines, it is necessary, for economic reasons, to collect and re-use the white water (i. e. the liquid which passes through the Fourdrinier wire), the white water being mixed with additional pulp or stock before being returned to the web-forming region.

The practical method of accomplishing this operation is by the use of a suitable pump, normally designated the stock pump, in conjunction with a closed conduit system. It thus becomes necessary in the stock conduit system to transform the confined stream of liquid discharged by the stock pump, which is usually circular in outline, into the shallow, relatively wide stream which is required at the web forming region, and the portion (or portions) of the stock conduit system which accomplishes this transformation is conventionally termed a "flow-spreader."

Moreover, in order to produce a paper sheet having uniform physical properties, the paper stock (which includes water, pulp, fiber, filler, dye, glue, etc.) delivered to the web-forming region of the machine should be evenly distributed across the machine width. Expressed mathematically, this means that the kinetic energy and fluid pressure in unit areas of the stream delivered to the web-forming region should be as uniform as possible throughout the stream cross section, and in addition, the entire stream should be maintained in a condition which is as near to steady-state flow as it is possible to obtain. In other words, the stock should be de-

2 livered to the web-forming region at a uniform pressure and velocity across the width of the machine, and the pressure and velocity relationship should be invariant with time.

The desirability of obtaining the uniform pressure steady-state flow conditions described above during the operation of papermaking machines is well recognized in the papermaking art, and various flow spreaders and other flow control arrangements have been suggested and used in an effort to attain these conditions. These arrangements have not, however, been completely satisfactory, even when the flowing stream of stock discharged from the stock pump is changed, in very gradual stages, from its initial circular form to the shallow, elongated, rectangularly-shaped form required in the web-forming region, although such arrangements have proven somewhat more satisfactory than most of the other flow spreading devices previously suggested in the art.

A second and more specific object of the invention, therefore, is to provide improved flow control means for the flow-spreading stock conduit systems of papermaking machines of the Fourdrinier and other types.

As will hereinafter appear, the above-stated objects of the invention are accomplished by the provision of flow control apparatus which utilize guide vanes of certain particular types and shapes, disposed in certain particular arrangements and locations. The invention makes possible much more positive and much more effective control of flowing streams of gases and of liquids, as, for example, the flowing streams of liquids encountered in papermaking stock conduit systems, than has heretofore been attained, and in addition, this improved flow control is accomplished in relatively short distances of flow. Thus, in addition to providing improved control of flow spreading and other operations, the invention makes possible material decrease in the physical dimensions of equipment wherein it is used.

In the drawings, wherein are illustrated certain embodiments of the invention,

Fig. 1 is a plan view, partially in section, of a flow conduit embodying certain of the features of the present invention;

Figs. 2 and 3 are, respectively, sectional and end elevational views of the structure illustrated in Fig. 1;

Fig. 4 is an enlarged, fragmentary, plan view of two of the guide vanes provided in the structure of Figs. 1–3;

Fig. 5 is a graph illustrating the variation in cross sectional area axially along the flow conduit illustrated in Figs. 1, 2 and 3;

Fig. 6 is a plan view, partially in section, of a second flow conduit embodying certain of the features of the present invention;

Fig. 7 is an enlarged fragmentary view illustrating the features and arrangement of certain of the guide vanes included in the structure of Fig. 6;

Figs. 8 and 9 are graphs illustrating certain of the hydraulic characteristics of the flow conduit structures shown in the preceding figures of the drawings;

Fig. 13 is a plan view, partially in section, similar to Fig. 1, of another flow conduit embodying features of the present invention;

Fig. 14 is an enlarged fragmentary sectional view on the general line 14—14 of Fig. 13;

Fig. 17 is a diagrammatic elevational view, partially in section, of the web-forming and inlet end of a high-speed, pressure-inlet type Fourdrinier papermaking machine which is provided with flow spreading means in the stock conduit system in accordance with the principles of the present invention;

Fig. 18 is an enlarged plan view of the flow spreading means illustrated in Fig. 17;

Fig. 19 is a sectional view on the general line 19—19 of Fig. 18;

Fig. 20 is an enlarged, fragmentary view illustrating certain of the features of the guide vane adjusting means embodied in the apparatus shown more particularly in Figs. 18 and 19;

Fig. 21 is a cross-sectional view of the web-forming end of a head box type papermaking machine provided with flow spreading and flow control means in accordance with the invention;

Fig. 26 is a sectional view similar to Fig. 21 of another headbox type machine utilizing a branched inlet conduit for the stock. Flow control means in accordance with the invention are embodied into each of the branched inflow conduits of this machine; and Fig. 27 is a fragmentary, sectional view on the general line 27—27 of Fig. 26.

Figure 10:
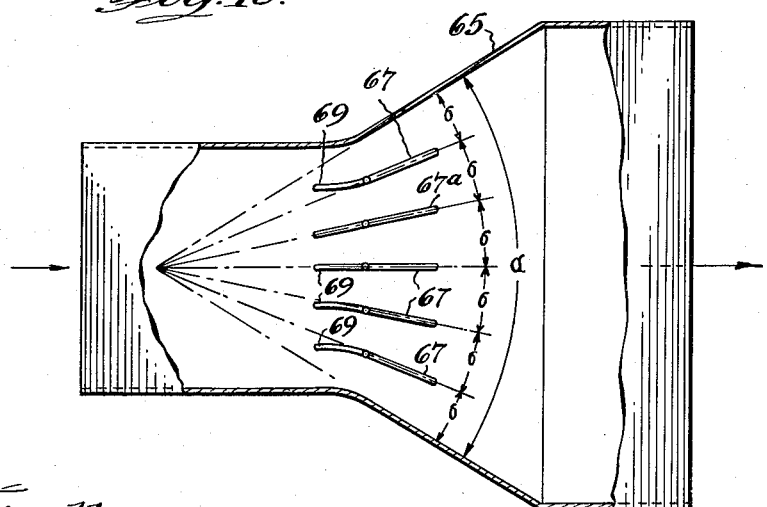
Fig. 10 is a plan view, partially in section, similar to Figs. 1 and 6, illustrating other features of the invention.

As previously stated, the flow control means of the present invention have particular relation to the control of flowing streams of fluids which include dispersions or suspensions of fibers and other materials, and which may be contained in closed conduits. The invention has particular value in connection with, and is especially applicable to flow spreaders such as are used for transforming the flowing stream of stock discharged from a stock pump into the shallow, elongated, rectangularly shaped form required in the web-forming region of the papermaking machinery. Accordingly, the invention will be described as applied to flow spreaders adapted for use in conjunction with papermaking machines of various types. It will be understood, however, that the invention is capable of use in conjunction with other types of flow control apparatus, and it will also be understood that the particular structures illustrated in the drawings are merely illustrative embodiments of the general principles involved.

Flow spreaders as used in the stock conduit systems of papermaking machines comprise, essentially, rigid-walled conduits adapted to be connected into the stock conduit system between the stock pump and the web-forming region of the machine, for the purpose of effecting the required widening and reduction in depth of the flowing stream entering the web forming region of the machine. Flow spreaders in accordance with the present invention are provided with a plurality of guide vanes disposed adjacent the inflow end thereof, and possibly elsewhere along the flow path. These vanes are so shaped and so positioned, with reference to the dimensions of the succeeding portions of the stock conduit system, that the stock is delivered to the web forming region of the machine under substantially uniform pressure across the width of the machine and with substantially uniform velocity throughout the cross section area in that region.

A flow spreader embodying a simplified arrangement of guide vanes in accordance with the invention is illustrated somewhat diagrammatically in Figure 1, in which figure an inflow conduit 31 is shown connected to a rigid-walled, laterally diverging conduit section, or flow spreader 33. The flow spreader 33 connects with a straight-sided outflow section 35, which may, for example, lead to the web-forming region of a papermaking machine. Conveniently, the opening at the inflow side of the flow spreader is rectangular in outline, and it may be square. The opening at the outflow end of the flow spreader is likewise of rectangular outline. However, it is wider, and may be of less or greater depth than the inflow opening. The inflow conduit should be of such dimensions that a flow condition which at least approximates steady-state flow is attained at the inflow end of the flow spreader.

A plurality of vane units 37 are positioned at the throat or inflow end of the flow spreader unit, and as shown particularly in Figure 4, each of the vanes 37, except the central or base vane 37a, includes a curved or arcuate section 39 at the up-stream end which is tangent to and merges with a flat section 41 at the down-stream end. Each of the illustrated vanes is fabricated from a rectangularly-shaped metal plate of uniform thickness. The curved sections 39 in the illustrated structures are sections of vertical, right cylinders of circular cross section, and the faces of the flat sections 41 are coincident with vertical planes. This is illustrated in the enlarged plan view of Figure 4. The central vane or vanes 37a may be straight.

As will hereinafter appear, curved surfaces other than sections of circular-cross-section, right cylinders can be used in the curved sections of the guide vanes in accordance with the invention. For example, right sections of cylindrical surfaces generated along curves other than a circle, for example, conic curves such as parabolas or hyperbolas can be used, as can spiral function and other curves. In general, the shape of the curved section becomes increasingly critical as the flow velocity increases.

In order to facilitate the accomplishing of the objects of the invention, each of the vanes 37 and 37a is supported on suitable pivots 43 (Fig. 2) so as to be rotatable to a limited extent about a vertical axis, which in the illustrated structure is co-incident with the center-line of the vane at the intersection of the curved and the flat sections of each of the vanes. The preferred location of the vane pivots is at the trailing edges of the flow control vanes, but for mechanical reasons, it is more convenient to position the pivots centrally of the vanes, adjacent the region of maximum pressure, and this arrangement is used in the several embodiments of the invention herein disclosed.

The upper end of each of the upper pivots 43 is threaded for engagement with a suitable clamp nut 45, in order that the vanes may be locked in position after adjustment. As illustrated, the radius of curvature of the arcuate sections of the vanes nearest the outer edges of the flow spreader is less than the radius of curvature of the arcuate sections of the inner vanes.

The vanes 37 are disposed with their axes of rotation in spaced, parallel relationship, and the dimensions of the vanes are such that the upper and lower edge surfaces thereof clear freely the upper and lower defining walls of the flow spreader 33. When used for the control of flowing streams of liquids containing fibrous suspensions or dispersions, such as the liquid stock normally used in papermaking, the clearance between the vane edges and the adjacent walls of the flow spreader may desirably be within the range of from about one-fourth to one inch. The vanes should, however, be of such width that at least eighty percent of the depth of the flowing stream is subjected to flow control by vane action. In air systems, less clearance can be used.

The vanes 37 divide the throat or inflow end of the flow spreader into a plurality of segmental sections as shown particularly in Figures 1 and 4. In the illustrated structure, which as previously stated is exemplary of a simplified form of the invention, the vanes are symmetrically arranged and divide the throat of the flow spreader into substantially equal angular segments each of which encompasses a divergence angle $\sigma$. When this vane arrangement is used, the divergence angle $\sigma$ included between each of the vane sections 37 should not exceed 15°, and for best results this angle should be within the range of from approximately 3 to 6°. The flat, trailing section 41 of each vane is normally disposed in a plane which intersects the axis of rotation of that vane and is coincident with the segmental division lines, as illustrated.

It follows that, in order to determine the number of vanes which will be required in a particular flow spreader of the general type shown in Figures 1, 2 and 3, the total effective angle of divergence of the flow spreader, expressed in degrees, when divided by fifteen will give the minimum possible number of segmental divisions of the flowing stream. The total divergence angle of the flow spreader is the angle subtended by straight lines joining the extreme side edges of the inflow and outflow openings of the flow spreader, as illustrated at $\alpha$ in Figure 1. In this connection, it should be noted that the number of segmental areas is one greater than the number of vanes. Thus, the minimum number of vanes N is equal to $$\frac{\alpha \text{ (in degrees)}}{15} - 1$$

The total angle of divergence in a flow spreader unit employing flow control vanes in accordance with the invention may reach a maximum of 180°, although it will generally be found desirable to restrict the maximum total angle of divergence to from about 80 to 120°.

The effectiveness of the vanes in accomplishing flow control is necessarily dependent upon the velocity of the flowing stream in the region in which the vanes are located. In general, the flow velocity must be sufficient to develop circulation or "lift" at the vane surfaces and for vanes of the type disclosed in the present application, this means that the vanes must be located in regions where the flow velocity is at least approximately one-half foot per second for liquid suspensions such as paper stock, and is at least approximately one-quarter foot per second for fibrous suspensions in air. The preferred operating range for both liquids and gases is from about five to ten feet per second in the vane region.

Since the maximum flow velocities are usually present at the inflow end or throat section of the flow spreader, it will usually be found advantageous to locate the vanes in this region, although the vanes can be placed downstream of the inflow end of the flow conduit, provided that the flow velocity in the selected region is adequate. Location of the flow control vanes in the throat section of the flow spreader has, however, certain other advantages. Particularly, the increased velocity existing in this region assures maximum scouring of the vanes during operation of the flow spreader, this being of especial importance in stock supply and other systems containing fibrous dispersions. Also, it is advantageous to effect the desired correction of the pressure and velocity conditions within the flowing stream as soon as possible along the stream conduit, flow control in this manner favoring the obtaining of steady-state flow within the conduit.

The dimensioning of the individual guide vanes located in the throat of the flow spreader is another feature of importance in assuring the development of adequate reaction force or "lift" at the vane surfaces. Generally, the vane dimensions should be such that the gap to chord ratio, i. e. the ratio of the segmental distance between the parallel leading edges of adjacent vanes (the dimension g of Figure 4) and the chord of each vane (the dimension c of Figure 4) should be within the range of from 1:2 to 1:4.

The use of a series of symmetrically-spaced flow control vanes as outlined in the foregoing will effect quite remarkable improvement in the pressure and velocity relationships existing at the outflow end of the flow spreader, as compared with the prior structures wherein vanes are not used. For example, in Figure 8 the curve labeled I is illustrative of the variation in the velocity of the flowing stream which is normally encountered along a transverse or across-the-machine section of a flow spreader, such as that illustrated at 33, in the absence of control vanes as described. The variation in the transverse velocity in this graph is expressed as the percent of the velocity (V) existing at any given point across the outflow end of the flow spreader when divided by the average velocity ($V_{av}$) over the entire outflow area of the flow spreader. It will be noted that the velocity variation may exceed 20 percent with reference to the average velocity, and that the total velocity variation in the stream may be in excess of 40 per cent of the average velocity. Variations of this magnitude, which are commonly encountered in papermaking machinery, are believed to be largely responsible for the difficulties experienced in the web forming region of such machines.

In Figure 9 there is a similar curve, labeled I, which is representative of the variation in pressure transversely across the outflow opening. The variation here bears the expected relation to the velocity variation, although the actual magnitude of the variation expressed percentagewise is somewhat less. The curves labelled II in Figures 8 and 9 show the effect of the guide vanes 37, and it will be evident that a remarkable improvement in the flow characteristics at the outflow end of the spreader has been accomplished by the addition of the vanes.

In certain instances improvement of the flow pattern through the flow spreader to the extent accomplished by the vane arrangement of the Figure 1 structure is not sufficient, and it is possible to materially increase the effectiveness of the control by adding to the basic control vane structure, exemplified by the Figure 1 embodiment, auxiliary vanes located in the outer, segmental flow sections. A flow spreader embodying such auxiliary vanes is illustrated in Figure 6. The flow spreader illustrated in this figure is essentially similar to the structure shown in Figs. 1–3. It includes an inflow conduit 47 of square or rectangular cross-section, which connects with a rigid-walled, laterally-diverging conduit section or flow spreader 49, and the flow spreader 49 in turn connects with a straight-sided outflow section 51. As in the previously described embodiment, the throat of the flow spreader is provided with a plurality of equally-spaced, symmetrically arranged vanes, illustrated at 53, which are fabricated from rectangularly-shaped metal plates and which divide the inflow or throat portion of the flow spreader into a plurality of segmental sections. The segmental sections encompass divergence angles $\sigma$ which should not exceed 15° and which preferably are within the range of from 3–6°. Each of the segmented vanes 53 (except the central or base vane 53a which has plane surfaces) includes a cylindrically-curved section 54 at the upstream end which is tangent to, and merges with a section 57, which is at least of less curvature than the section 54, and is preferably flat, at the downstream end. To this extent the construction of the flow spreader is similar to the previously described embodiment.

However, in each of the outer segmental areas there has been provided an auxiliary vane 55 which in its simplest form may follow the general shape of the other vane units 53, i. e. it may include a cylindrically-curved, upstream section 59, and a plane-surfaced, vertically disposed downstream section 61. This is illustrated particularly in Figure 7. The auxiliary vanes 55 located in the outer segmental sections of the flow spreader make possible increased localized control of the stream of liquid passing through the flow spreader, especially in the outer edge regions where friction losses are at a maximum and where an increased degree of control has been found to be particularly advantageous. Each of the auxiliary vanes 55, like each of the main control vanes 53, is supported by a vertical pivot 63 which is coincident with the center-line of the vane at the intersection of the curved and the flat vane sections, in order that the vanes can be adjusted between predetermined limits. The pivots 63 should include clamping means, as in the previously described structure, in order that the vanes 55 may be locked in place after adjustment.

In the illustrated structure, the arcuate sections 54 of the main control vanes 53, similar to the arcuate sections 39 of the vanes 37, are sections of right vertical cylinders, and the radius of curvature for the outer vane sections is less than the radius of curvature for the inner vane sections. The axis of the vertical pivot support 63 for each of the main vanes 53 coincides with the boundary lines of the segmental divisions $\sigma$, as illuustrated.

The auxiliary vanes 55 follow the same general arrangement, and desirably, the curved section 59 of each of the auxiliary vanes constitute a section of a right-vertical cylinder having a lesser diameter than the curved section 54 of the next adjacent segmental or main vane 53, i. e. the radius $r_2$ of Figure 7 is less than the radius of $r_1$. The axes of the vertical pivot supports 63 for the auxiliary vanes 55 are located approximately midway of the outer segmental sections, as shown.

The angular positioning of the auxiliary vanes 55 about the vertical pivots 63 is best determined on the basis of actual operation of the flow spreader. However, tests indicate that the optimum operating position for each of the auxiliary vanes 55 is between a position where the sides of the flat section 61 of the vane are parallel to the adjacent side of the flow spreader and a position where the sides of the flat section 61 are parallel to the central axis of the flow spreader. The auxiliary vane 55 illustrated in Figure 7 is positioned with the flat section 61 almost parallel to the adjoining side of the flow spreader.

The important improvement effected by the use of the auxiliary vanes in the outer segmental sections of the illustrated apparatus is shown in the curves labelled III in Figures 8 and 9, and it will be noted that the extreme variation in the velocity of flow across the width of the outflow side of the flow spreader, as compared to the average velocity, does not exceed more than about 3 percent, and the pressure variation has been reduced to not more than about one-half of one percent. Flow control to this degree has never previously been accomplished in flow spreading apparatus of this general type, and the actual operation of equipment embodying flow spreaders with vane controls of this character has convincingly demonstrated the remarkable effectiveness and utility of the invention.

In the two exemplary embodiments of the invention described in the foregoing, the main flow control vanes have been arranged symmetrically with respect to the central axis of the flow spreader, i. e. the segmental divisions encompass substantially equal divergence angles in the region of the vane pivots. This arrangement will usually be found quite satisfactory for accomplishing the objects of the invention, provided that the velocity distribution in the flowing stream of stock is reasonably symmetrical in the two halves of the flow spreader, since by relatively minor adjustment of the vanes, it becomes possible to attain substantially equal volumetric discharge of fluid in each segmental section. In some flow conduit systems, however, the flowing stream which is delivered to the inflow end of the flow spreader may, for one reason or another, exhibit non-uniform velocity distribution. For example, in some paper machine, stock conduit systems, especially where the stock pump is located in close proximity to the inflow end of the flow spreader, one-sided or asymmetric velocity and pressure relationships may be found in the flowing stream obtained in the stock conduit. When a stream of this character passes through a flow spreader, the uneven pressure and velocity distribution at the inflow end will tend to carry through to the outflow end, with uneven volumetric discharge from the segmental sections and with the added possibility that transient or sustained oscillatory conditions may be set up in the stream passing from the flow spreader. The velocity and pressure relationships in a stream of this character are illustrated in the graphs, Figures 11 to 12, which are generally similar to Figures 8 and 9, and wherein the curves labelled I in each of the figures illustrates the velocity and pressure distribution across the width of the outflow side of the flow spreader under the above-described conditions.

In instances of this type, it will be found desirable to use control vane arrangements, which may be of the basic, flow-dividing type illustrated in Figure 1, or of the combined type illustrated in Figure 6, which are asymmetrically disposed with relation to the central axis of the flow spreader. Such an arrangement is illustrated in Figure 10. In this construction, the flowing stream passing through the flow spreader 65 is divided by a plurality of control vanes 67 (which may be similar to the vanes 37 and 53) into segmental sections, each of which includes a divergence angle $\sigma$ of not more than 15° (and preferably within the range of 3–6°) as previously described. However, in this construction, the flat or base control vane 67a is located as near as possible to the center of a maximum velocity region in the inflowing stream admitted to the throat of the flow spreader, and the outer vanes 67 (which include curved upstream sections 69) are disposed at either side of the base vane 67a.

As in the previously described embodiments, the curved sections 69 of the vanes 67 constitute sections of right cylinders and the degree of curvature increases in the individual vanes outwardly from the base vane 67a.

Figure 11:
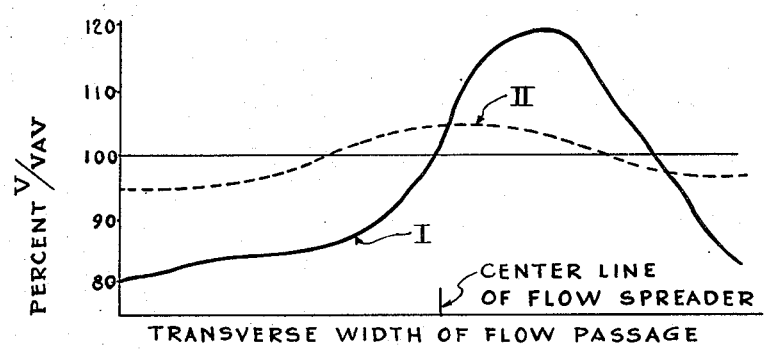
Figs. 11 and 12 are graphs similar to Figs. 8 and 9, illustrating certain of the hydraulic characteristics of the flow conduit illustrated in Fig. 10.
Figure 12:
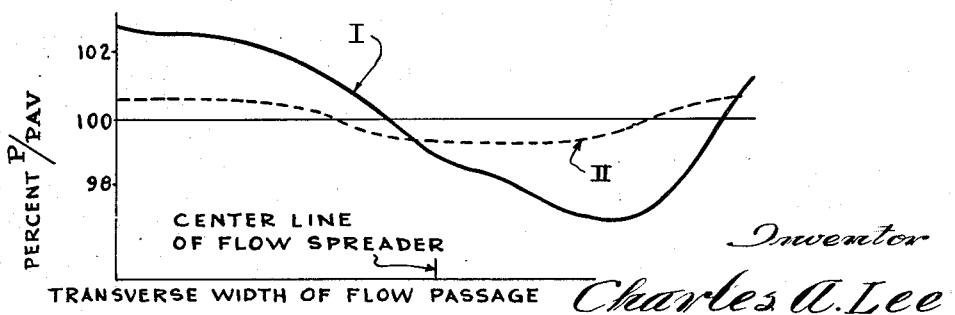

The curves labelled II in Figures 11 and 12 illustrate the uniforming of the velocity and pressure relationships across the transverse width of the flow spreader 65 which are effected by the use of asymmetrically located control vanes 67, as above described. It will be seen that the arrangement makes possible a very effective evening out of the flow with the additional advantage of minimizing the possibility of pulsations or other undesirable transient conditions. It will be understood that asymmetrical vane arrangements may include auxiliary vanes, as in the Figure 6 construction, in the outer segmental sections with further improvement of the flow pattern.

It will be noted that the inner surfaces of the side walls of the several flow-spreading units described in the foregoing are curved at the juncture of the inflow and flow-spreading sections thereof, this being shown particularly at 70 in Figure 7. This surface curvature of the side walls desirably follows the stream lines of the flow in this region and is of considerable value in attaining uniform steady-state flow at the outlet of the flow spreader. It will also be noted in the illustrated structures, that elements of the defining surfaces of the side walls extend generally parallel to elements of the defining surfaces of the vanes. This tends to increase the effectiveness of the vanes in accomplishing division of the flowing stream into uniform segmental flow sections.

In the previously described structures, the vane arrangement is generally on a geometric basis, i. e. the flow path is divided into a plurality of flow segments having equal divergence angles. For best results, the volumetric discharge from the several segments produced by the control vanes should be substantially equal, and this condition is generally obtained by the described geometric spacing of the vanes, provided that the velocity pattern in the inflowing stream is not too irregular or too one-sided.

However, the vane arrangement may be based on an actual measured division of the flow path into segments of equal flow, and where particularly accurate control is desired, this division may be preferred. The determination of the boundaries of the equal flow segments can be conveniently determined by a velocity traverse of the area of the flow path. The number of segments N remains the same regardless of whether equal angle or equal flow volume segments are used, i. e. the minimum number of segments $$N = \frac{\alpha \text{ (in degrees)}}{A} - 1$$

where A is not more than 15 and is preferably within the range of 3 to 6.

The control vane arrangement used in the previously described embodiments of the invention are, except for the base vane which is preferably flat, curved in one direction only, i. e. all of these vanes have a curved leading section, the surfaces of which are tangent to and merge with the surfaces of flat-surfaced trailing section. Also, the surfaces of the curved sections of the disclosed structures are coincident with the surfaces of vertically disposed, right cylinders of circular cross-section. All of the disclosed vanes are made from plate material, and hence are of uniform thickness, except for a slight rounding of the leading and trailing edges. With vanes of this type, it is possible to achieve a very high degree of control of flowing streams of liquids or gases, and especially flowing streams of liquids or gases which contain fibrous suspensions or dispersions and which may be contained within closed conduits, as for example, the stream of stock passing through the flow spreader of a papermaking machine.

The principles of flow control herein disclosed are not, however, limited to the use of vanes which are curved in only one direction, or to vanes which are of uniform thickness, and in instances where added refinement of control is desired, multiple curved vanes and vanes of special cross-sectional outline may be used. An example of a flow spreader structure employing vanes which are curved in two directions and which are of non-uniform thickness is illustrated in Figure 13.

This unit is generally similar to the previously described structures and includes an inflow section 71 of rectangular cross section 73 (but which could be square), a diverging flow spreader section 73 having a total divergence angle as indicated by the angle $\alpha$, and a straight sided outflow section 75. The flow passageway through the flow spreader 73 unit is divided into a plurality of equal-angle segmental sections, each of which encompasses a divergence angle $\sigma$ of about 6°, by a plurality of main, flow control vanes 77, as illustrated. The unit includes the usual straight sided base vane 77a, arranged centrally of the flow spreader (or coincident with the axis of flow through the flow spreader) and, desirably, the unit also includes auxiliary vanes 79 in the outer segmental regions. The sides of the flow spreader section 73 are curved so as to coincide generally with the flow lines in the stream passing through the flow spreader, as illustrated at 80.

The control vanes 77 and 79, in this embodiment of the invention, each include a leading section 81 which is curved to provide generally cylindrical surfaces on the two sides of the vane section, which surfaces are coincident with the surfaces of concentric, vertically inclined cylinders of circular cross-section. Each of the cylindrical leading sections merges into a generally flat-surfaced trailing section 83 which is twisted or skewed relative to elements of the leading section. The leading edges of the vanes, as in the previously described structures, are arranged in generally parallel, vertical relationship, and both sections of the vanes are merged smoothly into one another. The resultant vanes have flow control surfaces in both the horizontal and the vertical plane, i. e the vanes are multiple-curved vanes. Also, since the curvature of the leading sections 81 and the angle of twist of the trailing sections 83 increases in the vanes outwardly from the center or base vane 77a, the displacement of the vane surfaces in both planes likewise increases as the distance from each vane away from the central vane increases. To obtain improved flow characteristics, the leading edges of the vanes are rounded, as in the previously described structures, and in addition, the leading sections themselves are shaped into at least an approximation of hydrofoil outline, as illustrated in Figure 14. The leading sections 81 in the vanes at opposite sides of the center line of the flow spreader are curved in opposite directions, similar to the single curved vanes previously described, and the twisted trailing sections 83 are likewise twisted in opposite directions on opposite sides of the center line, as illustrated in Figure 13.

As in the single-curved vane arrangements, the multiple-curved vanes should be supported for limited rotative adjustment about vertical axes, and suitable means for accomplishing this is illustrated in Figures 13 and 14. As there shown, each of the vanes 77 and 79 is supported on a suitable spindle 85 which is journalled into a bearing 87 provided in the upper closure for the flow spreader 73. An adjusting arm 89 engages the projecting upper end of each spindle 85, and each of these arms 89 is adapted to be held in position by an adjustable clamping means which includes a threaded rod 93, supported on the upper side of the flow spreader. The outer end of each of the vane adjusting arms 89 is provided with a suitable enlarged opening 95 for receiving the threaded rod, and each arm is engaged by two clamping nuts 97, this making possible convenient and accurate rotative adjustment of the guide vanes during use. To permit removal of the vane units for cleaning or other purposes and the return of the vanes without loss of adjustment, the spindles 85 may have flattened side portions, as indicated at 96, which index with similarly shaped portions of the arms 89.

The double curvature of the vanes makes possible considerable refinement in the control accomplished by the vanes. Particularly, the double curved arrangement of the vane surfaces, by imparting a slight twisting action to the stream acted upon by each vane, effects substantial erasure of the wake which is produced downstream of that vane in a very short distance of flow. Important improvement in the stability and steadiness of flow thereby results. It will be understood that the double curved vanes can be used in laterally diverging conduits which decrease in depth along the direction of flow therethrough, or otherwise, as described above in connection with the single curved vane types.

Figure 15:
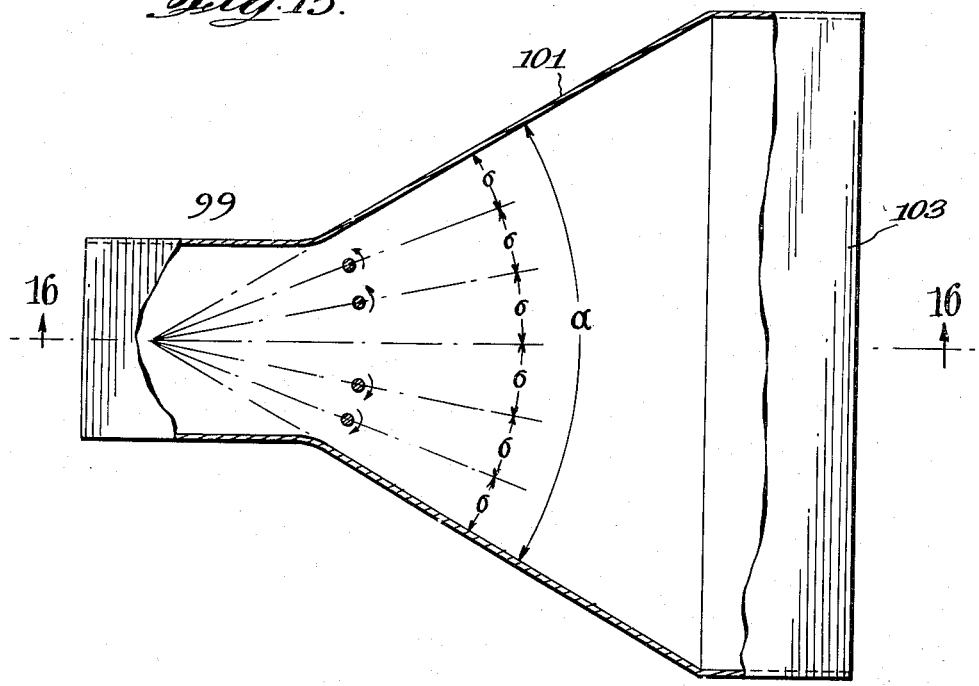
Fig. 15 is a plan view similar to Figs. 1 and 6, illustrating still another flow conduit embodying flow control means in accordance with the invention.
Figure 16:
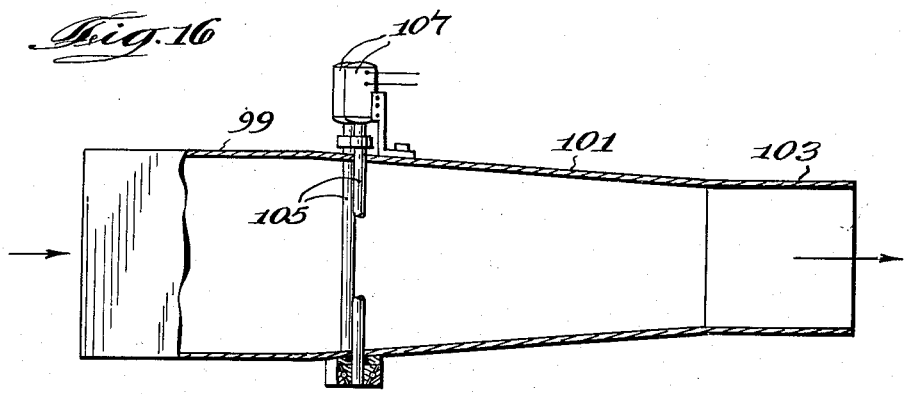
Fig. 16 is a sectional view on the general line 16—16 of Fig. 15.

Still another flow control mechanism in accordance with the general principles of the present invention is illustrated in Figures 15 and 16. This structure includes an inflow conduit 99 of rectangular or square cross-section, a flow spreading section 101, and an outflow section 103, conveniently fabricated of plate sections similar to the previously described structures, and it employs flow control means which consists of a plurality of independently driven, generally symmetrically arranged, rotatable rods or shaft-units 105, of circular cross-section. These shaft units, as illustrated in the drawings, are located so as to define segmental flow sections in the flow path through the flow spreader, similarly to the vane controls previously described, except that there is no control unit on the center line of the flow-spreader. In this connection, it will be understood that the flat control vane can be omitted under very favorable flow conditions, and that, in general, the vanes and rotating shafts are comparable flow control mechanisms.

Each of the segmental sections into which the flow spreader is divided for the purpose of locating the flow control shaft-units should include a divergence angle of not more than 15°, and preferably should include an angle within the range of from 3 to 6°. Such a division is illustrated in Figure 15 where the total divergence angle of the flow spreader is indicated by the angle α and the segmental sections by the angles σ. The shaft-units 105 have polished surfaces and have a diameter which is desirably within the range of from about $\frac{1}{16}$ to $\frac{1}{4}$ of the transverse width of the segmental sections at the region in which they are located. The shaft-units may be located centrally of segmental sections of equal flow per unit of time, as in the previously described structures.

Each of the flow control shaft-units 105 is arranged to be independently driven at a selected speed by means of independent, variable-speed motor drives 107. The units 105 in the opposite halves of the flow spreader 101 are driven in opposite directions as indicated by arrows in Figure 15, unless the velocity and pressure relationships in the inflow stream are asymmetrical. In such instances, the rotation of the rods is arranged to reverse on either side of the center of the flow pattern. The shaft-units 105 should be driven at a relatively high speed in order to minimize the possibility of wake formation. Generally, the speed of rotation of the shaft-units 105 should be sufficient to produce peripheral speeds at the surface of the units which is at least four times the flow velocity in the region of those units.

For most satisfactory results, the cross-sectional area of the flow spreader in accordance with the invention should increase in the direction of flow through the flow spreader, as is shown in Figure 5. If the cross-sectional area of that portion of the supply conduit immediately preceding the guide vanes (or shaft-units) exceeds the cross-sectional area of adjacent upstream portions of the supply conduit, difficulty in maintaining the flow pattern will be observed. It is permissive, however, to decrease the cross-sectional area of the supply conduit in the region immediately preceding the flow spreader and guide vanes, and in some instances, this may be found desirable. Also, in some instances, a perforated baffle plate or equivalent flow-evening unit may be placed adjacent the inflow or outflow end of the flow spreader, or adjacent both ends with advantageous results.

An example of a papermaking stock supply conduit system having embodied therein a flow spreading section or unit in accordance with the present invention is illustrated somewhat diagrammatically in Figure 17. In this figure the stock or fan pump by which the stock is delivered to the web-forming region of the machine is illustrated at 109. The pump 109 has a circular discharge outlet, and the system includes a transition section 111, which changes the shape of the flowing stream discharged by the pump from a circular outline to a square outline. The transition section 111 connects the outflow side of the pump 109 to the inflow end of a flow spreader unit 113 embodying control vanes in accordance with the invention.

More particularly, the flow spreader unit 113 constitutes, in effect, the initial portion of a much larger flow spreader 115 which includes an initial horizontal section 117, an elbow section 119, and a vertical section 121. The flow passageway 123 through the flow spreader 115 is rectangular in cross section, and it increases uniformly in width until it reaches the full width of the machine at the inflow side of the machine inlet 125. The cross-sectional area of the flow passageway 123 increases gradually in the direction of flow, the area of the outflow opening at the point where the passageway 123 connects with the flow passageway 127 in the inlet 125 being, in the illustrated structure, about 300 per cent of the area of the inflow opening of the unit 113. The inlet flow passageway 127 is of uniform cross section 125, and this passageway conducts the stream of stock to the web-forming region of the machine, in which region the stock is discharged against and in part through the Fourdrinier wire illustrated at 129. The wire 129 is supported by the usual breast roll 131, so as to extend across the outflow end of the inlet, and the apparatus includes a slice 133 of known type for confining the flowing stream of liquid delivered by the inlet 125 to the web-forming region. The breast roll 131 may be of conventional structure, or otherwise, and the usual suction boxes 135 or other means will be provided for aiding in effecting drainage of water through the wire during the web forming operation.

As previously indicated, the cross sectional area of stock conduit systems embodying the flow spreading and flow control means of the present invention desirably increases axially along the path of flow of the stock. It is possible, however, to operate a stock supply system such as that illustrated in Fig. 17 with a flow conduit of substantially uniform cross sectional area, or even of decreasing cross-sectional area throughout its length.

The provision of flow control means in accordance with the invention immediately following the fan pump, as shown in Fig. 17, has certain advantages in that the stream flow is established in a substantially uniform, steady-state condition at the earliest possible point in the stock conduit. In this connection, it should be noted that while the stream entering the flow spreader should be in a steady-state condition, it may not have a uniform velocity distribution across the width of the flow spreader. The arrangement has the disadvantage that the control vanes are located a considerable distance from the web-forming region, and to that extent the control effected in the critical region is reduced. As an alternative arrangement, the control vanes may be located at some other point in the flow spreading portion of the system closer to the web forming region, and a set or plurality of sets of control vanes spaced along the stock conduit may be used. The arrangement of Fig. 17 is, however, particularly adapted for incorporation into existing machine structures without material modification of the remaining portions of the stock conduit and flow spreading system.

The flow spreading and flow control unit 113 includes flow control vanes 137 of the single curvature type as shown particularly in Fig. 18, and these vanes are arranged so as to divide the flow spreader into segmental sections encompassing divergence angles of approximately 3°. Auxiliary vanes in the outer segmental sections are not provided in the illustrated structure. Similar to the vane arrangements illustrated in Figs. 1 and 6, the single-curved vanes 137 are made from suitable plate material, and each of the vanes 137 outwardly of the flat-sided central or base vane 137a, includes a cylindrical, curved section 139 at the stock inflow side, which merges with a flat section 141 at the outflow side.

The surfaces of the curved sections 139 are surfaces of right, vertical cylinders of circular cross-section, and the curvature of these surfaces increases as the vanes progress outwardly from the base vane 137a. For example, in a unit having an inflow opening 142 (Fig. 19) approximately 18 inches square, the cylindrical section 139 of the outermost vane constituted a section of the surface of a cylinder 12 inches in diameter, and the cylindrical section of the innermost vane 139 constituted a section of the surface of a cylinder 48 inches in diameter. The intermediate curved sections 139 constituted sections of the surfaces of cylinders having diameters intermediate these limits. The leading and trailing edges of the vanes 137 are rounded, as in the previously described structures.

Each of the vanes 137 is supported for limited rotative adjustment about a vertical axis coincident with the center-line of the vane at the intersection of the curved and flat sections thereof by suitable pivots or spindles 143. The upper spindles 143 are each provided with a projecting portion which is engaged by suitable adjustment arms 145, and the outer ends of these arms are held between pairs of adjustable nuts 147 disposed on a transversely-extending, threaded rod 149 as illustrated. The vane adjusting arrangement is thus similar to the arrangement shown in Figures 13 and 14.

Figure 23:
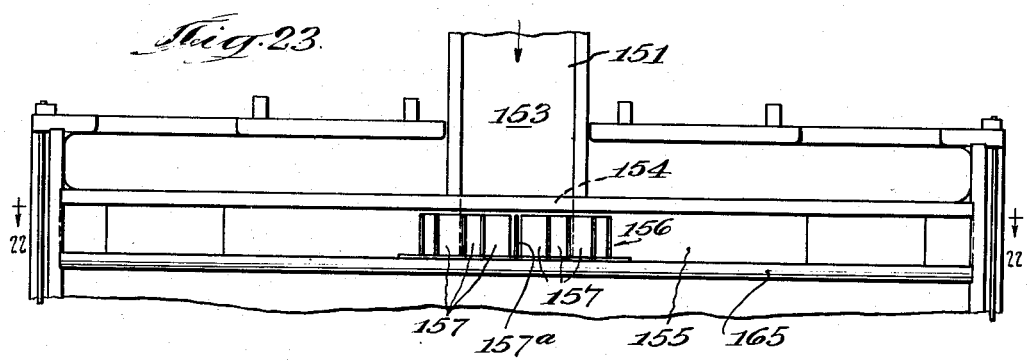
Fig. 23 is a plan view of the structure illustrated in Fig. 22.
Figure 22:
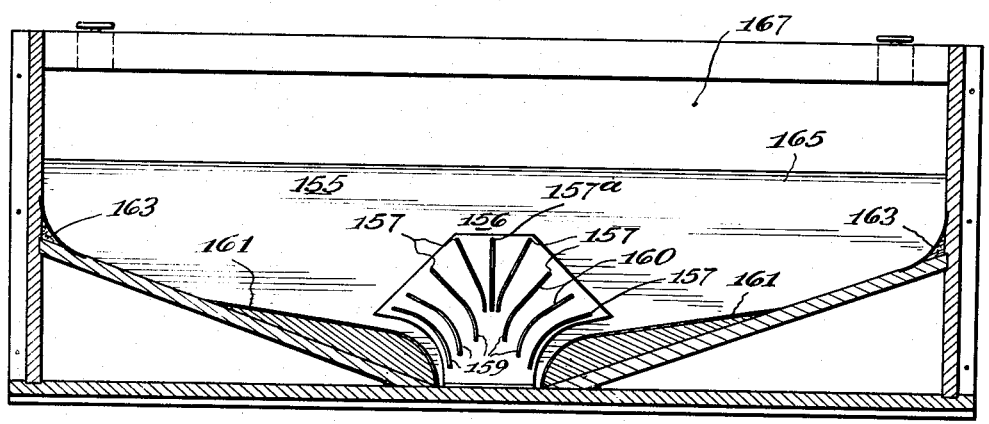
Fig. 22 is a sectional view on the line 22—22 of Fig. 21.

Flow control means in accordance with the invention may be utilized in conjunction with headbox-type paper-making machines as well as inlet type machines. In Figures 21, 22 and 23, for example, there is illustrated the web-forming end of a headbox type papermaking machine which is provided with flow spreading and flow control means in accordance with the invention. In this machine, the stock is supplied to the headbox by way of a suitable stock inflow conduit or trough 151 which will be arranged to receive the output of the Bird or other stock screens.

The stock enters the headbox proper through a vertical conduit 153 which connects at its lower end with the interior of the headbox through a rectangularly-shaped inlet opening 154. The inlet opening 154 opens into the throat of a vertically-disposed, flow spreading section 155 which accomplishes the function of spreading the inflowing stream of stock to the full width of the machine, and in the illustrated apparatus, a flow control vane unit 156 in accordance with the invention is positioned at the inflow end of the flow spreader section 155.

Figure 24:
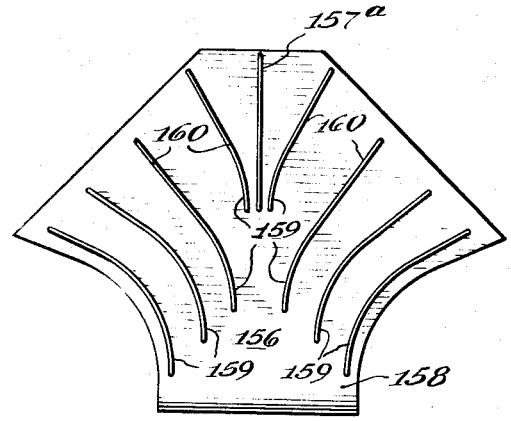
Figs. 24 and 25 are, respectively, enlarged front and side elevational views of the flow control means embodied in the headbox structure illustrated in Figs. 21 and 22.
Figure 25:
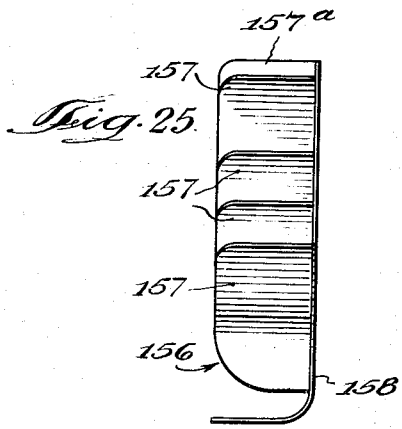

As illustrated particularly in Figures 24 and 25, this flow control, vane unit 156 comprises a plurality of symmetrically-arranged flow control vanes 157 of the general type illustrated in Figures 1 and 6, which are supported in fixed position upon a suitable bar or support plate 158. Each of the vanes 157 extends substantially completely across the width of flow spreader section 155. The central vane 157a is flat, and each of the other vanes includes an arcuate leading section 159 and a flat trailing section 160. The arcuate sections 157 are cylindrical in form and constitute sections of right cylinders, the axes of which are perpendicular to the defining walls of the flow spreader section. Each of the vanes 157 is fabricated from thin, sheet material, and the curvature increases in the leading sections 159 outwardly from the central or base vane 157a, as in the previously described structures. The side walls 161 of the throat portion of the flow spreader are curved to approximate the flow path in that region; and, to prevent the formation of stagnation areas at the outflow end of the flow spreader, suitably curved baffles 163 are provided in the outer edged portions thereof, as shown.

The flow control, vane unit 156 is so constructed that it can be removed as a unit from the headbox for cleaning or other purposes, and then replaced without disturbing or changing the vane adjustment. This is made possible by the fixed mounting of each vane unit on the base plate 158 and by the use of suitable screw fastenings (not shown), whereby the entire unit is releasably attached to the headbox. This is a very desirable feature of the invention, as is the provision of equivalent means (such as the flat sided spindles 85) which will permit the removal of the single vane units described in the foregoing, for cleaning and other purposes, and the return of those units without change of adjustment.

The forward defining wall 165 of the vertical flow spreader also serves as the rear wall of the headbox ponding chamber 166, and the stock flows over the top of this wall in passing into and through the headbox. To provide the usual circuitous flow path through the ponding chamber 166, a pair of adjustable baffles 167 and 169 are arranged in the path of flow subsequent to the outlet of the flow spreader 155, and a distributor or rectifying roll 171 may be employed adjacent the headbox outlet, as shown. The stock is discharged from the headbox onto the wire, which is indicated at 173, through a suitable throttling slice, as indicated generally at 175.

The utilization of a flow spreader section equipped with flow control vanes in connection with headbox type machines, as described in the foergoing, has been found to accomplish very substantial improvement in the uniformity of delivery of the stock to the web-forming region of the machine with resultant improved web formation at increased operational speeds.

Another type headbox machine utilizing flow control means in accordance with the invention is illustrated in Figures 26 and 27. This machine differs from the above-described structure principally in that the stock is admitted to the headbox 181 through a plurality of spaced-apart inflow openings 183 which are square in outline and which are connected to a suitable, stock supply manifold 185 by individual conduits 186. Each of the conduits 186 includes a transition section 189 which changes the cross-sectional outline of the flowing stream of stock contained therein from a circular outline to the square outline of the stock inflow opening 183 with which it connects.

Control vanes 187 in accordance with the design principles of the flow control vanes illustrated in Figures 1 and 6 are located at the outflow end of each of the transition sections 189 and suitable baffles and end fillet sections 190 for defining the side walls of what constitutes in effect a plurality of diverging-wall flow spreader sections are provided at the inflow portion of the headbox. The control vanes 187 follow the design principles previously set forth, and each includes an arcuate leading section 191 and a flat-sided trailing section 193, which may be similar to the vanes 157. The edges of the vanes 187 are attached to an outlining frame or support member 195 and hence are fixed in position, similar to the vanes 157. The stock passes through the headbox in a circuitous path as indicated by the arrows, which is defined by flow control baffles 197 and 199, and the portions of the headbox adjacent these baffles are desirably provided with curved insets 201 for preventing the formation of dead areas.

In the foregoing, various means for effecting the control of flowing streams of liquids and gases have been disclosed. Basically, these means employ flow control vanes of various types, or shafts, disposed in certain particular arrangements and locations. The invention, as previously pointed out, has particular and important application in the control of flowing streams of fluid which contain a suspension of fibers or other materials, as for example in connection with the flow spreaders used in papermaking machines, and a number of embodiments of the invention particularly adapted to this use have been illustrated. However, the invention is of broader application and makes possible greatly improved control of flowing streams of various types, and especially flowing streams which are confined in closed conduits. In this connection, it is important to note that the flow control means of the present invention accomplishes sufficiently effective control of the flowing stream to assure uniform as well as steady flow throughout such stream. Structurally, the invention is relatively simple, and may be easily embodied into apparatus with which it is to be used at relatively low cost.

Flow control means in accordance with the invention accomplishes the desired flow control without introducing any substantial pressure drop or head loss into the system with which the invention is used; the flow control means of the invention thus operates at very high efficiency. In addition, there is little tendency for the apparatus to foul or clog during use, even when fibrous suspensions of relatively high concentrations are contained in the flowing stream which is being controlled. Also of importance from the viewpoint of trouble-free service, flow control means in accordance with the invention can be arranged for easy and convenient removal from the associated apparatus for cleaning or servicing.

Other important advantages of the invention result from the fact that flow control vanes or shafts in accordance with the invention are readily adjustable, thereby adapting any particular set of controls or any particular control unit for use in conjunction with any one of a plurality of associated equipments, or for use under varying operating conditions. The capability of the flow control means of the invention to effectively control flowing streams at very wide divergence angles is likewise an important feature of the invention, because of the resulting economic advantages in the reduction of the size of equipment, buildings, etc.

Various of the features of the invention believed to be new are set forth in the accompanying claims.

I claim:

1. In flow control apparatus of the class described, means defining the walls of a laterally-diverging conduit for containing a flowing stream of fluid, a plurality of spaced-apart, main, flow control vanes which are disposed between the laterally-diverging walls of said conduit and which divide said conduit into a plurality of substantially uniformly dimensioned segments, each of which encompasses a divergence angle of not more than 15°, and a pair of auxiliary, flow control vanes, one of which is located in each of the two outermost segments provided by said main flow control vanes.

2. In flow control apparatus of the class described, means defining the walls of a laterally-diverging conduit for containing a flowing stream of fluid, a plurality of spaced-apart main flow control vanes which are disposed between the laterally-diverging walls of said conduit adjacent the inflow end thereof and which divide said conduit into a plurality of substantially uniformly dimensioned segments, each of which encompasses a divergence angle within the range of from 3° to 15°, and a pair of auxiliary, flow control vanes, one of which is located in each of the two outermost segments provided by said main flow control vanes, each of a plurality of said main, flow control vanes and both of said auxiliary flow control vanes having a section of predetermined curvature at the upstream end thereof and a section of less curvature at the downstream end thereof.

3. In flow control apparatus of the class described, means defining the walls of a laterally-diverging conduit for containing a flowing stream of fluid, a plurality of spaced-apart, main, flow control vanes which are disposed between the laterally-diverging walls of said conduit and which divide said conduit into a plurality of substantially uniformly dimensioned segments, each of which encompasses a divergence angle within the range of from 3° to 15°, and a pair of auxiliary, flow control vanes, one of which is located in each of the two outermost segments provided by said main, flow control vanes, the main flow control vane located nearest the central axis of said flowing stream being flat and the other flow control vanes each having a curved section at the upstream end thereof and a flat section at the downstream end thereof, which merges smoothly into said curved section.

4. In flow control apparatus of the class described, means defining the walls of a laterally-diverging conduit of rectangular cross-section for containing a flowing stream of fluid, a plurality of spaced-apart, main, flow control vanes which are disposed between the laterally-diverging walls of said conduit, said vanes dividing said conduit into a plurality of substantially uniformly dimensioned segments, each of which encompasses a divergence angle within the range of from 3° to 15°, and a pair of auxiliary, flow control vanes, one of which is located in each of the two outermost segments provided by said main, flow control vanes, the main, flow control vane located nearest the central axis of said flowing stream being flat, the other of said main, flow control vanes and both of said auxiliary, flow control vanes each having a section of predetermined surface curvature at the upstream end thereof and a flat section at the downstream end thereof, and the control vanes on opposite sides of said flat vane being curved in opposite directions.

5. In flow control apparatus of the class described, means defining the walls of a laterally-diverging conduit of rectangular cross-section for containing a flowing stream of fluid, a plurality of spaced-apart main, flow control vanes which are disposed between the laterally-diverging walls of said conduit adjacent the inflow end thereof, said vanes dividing said conduit into a plurality of substantially uniform dimensioned segments, each of which encompasses a divergence angle within the range of from 3° to 15°, and a pair of auxiliary, flow control vanes, one of which is located in each of the two outermost segments provided by said main, flow control vanes, the main flow control vane located nearest the central axis of said flowing stream being flat, the other of said main, flow control vanes and both of said auxiliary, flow control vanes each having a section of predetermined surface curvature at the upstream end thereof and a flat section at the downstream end thereof, the laterally-diverging side walls of said conduit adjacent the inflow end thereof being curved in approximately the shape of the flow stream-lines in that region, the control vanes on opposite sides of said flat vane being curved in opposite directions, the curvature in said control vanes increasing outwardly from said flat vane, and the surfaces of said control vanes having elements extending generally parallel to elements of the surfaces of the diverging walls of said conduit.

6. In flow control apparatus of the class described, means defining the walls of a conduit for containing a flowing stream of fluid, and a plurality of spaced-apart, flow control vanes disposed within said conduit in position to act upon said flowing stream of fluid, each of said flow control vanes having a section of predetermined surface curvature at the upstream end thereof, and a section of less surface curvature at the downstream end thereof, said sections merging smoothly into each other, and the surfaces of said sections being of such form and so disposed relative to each other that reaction forces in at least two planes at right angles to each other are produced on each of said vanes.

7. In flow control apparatus of the class described, means defining the walls of a conduit for containing a flowing stream of fluid, and a plurality of spaced-apart, flow control vanes disposed within said conduit in position to act upon said flowing stream of fluid, each of said flow control vanes having a curved-surfaced section at the upstream end thereof and a flat-surfaced section at the downstream end thereof which merges smoothly into said curved-surfaced section, and at least one surface of the flat-surfaced section of each of a plurality of said vanes being angularly disposed relative to the surface defining elements of at least one surface of the adjoining curved-surfaced section, whereby reaction forces in at least two planes at right angles to each other are produced on each of a plurality of said vanes.

8. In flow control apparatus of the class described, means defining the walls of a laterally-diverging conduit for containing a flowing stream of fluid, and a plurality of spaced-apart, flow control vanes which are disposed between the laterally-diverging walls of said conduit and which divide said conduit into a plurality of segments, each of which encompasses a divergence angle within the range of from 3° to 15°, each of said flow control vanes having a section of predetermined surface curvature at the upstream end thereof and a section of less surface curvature at the downstream end thereof, said sections merging smoothly into each other, and the surfaces of said sections being of such form and so disposed relative to each other that reaction forces in at least two planes at right angles to each other are produced on said vanes.

9. In flow control apparatus of the class described, means defining the walls of a laterally-diverging conduit for containing a flowing stream of fluid, and a plurality of spaced-apart, flow control vanes which are disposed between the laterally-diverging walls of said conduit and which divide said conduit into a plurality of segments, each of which encompasses a divergence angle within the range of from 3° to 15°, the flow control vane located nearest the central axis of said flowing stream being flat and the other flow control vanes each having a curved section at the upstream end thereof and a flat section at the downstream end thereof which merges smoothly into said curved section, the curved sections at opposite sides of said flat vane being curved in opposite directions, and the curved and flat surfaces of said vanes having curved sections being so disposed relative to each other that reaction forces in at least two planes at right angles to each other are produced on each of said vanes.

10. In flow control apparatus of the class described, means defining the walls of a laterally-diverging conduit for containing a flowing stream of fluid, a plurality of spaced-apart, main, flow control vanes which are disposed between the laterally-diverging walls of said conduit and which divide said conduit into a plurality of substantially uniformly dimensioned segments, each of which encompasses a divergence angle of not more than 15°, and a pair of auxiliary, flow control vanes, one of which is located in each of the two outermost segments provided by said main, flow control vanes, each of said main, flow control vanes and each of said auxiliary flow control vanes having a section of predetermined surface curvature at the upstream end thereof, and a section of less surface curvature at the downstream end thereof, said sections merging smoothly into each other, and the surfaces of said sections being of such form and so disposed relative to each other that reaction forces in at least two planes at right angles to each other are produced on said main and said auxiliary vanes.

11. In flow control apparatus of the class described, means defining the walls of a laterally-diverging conduit for containing a flowing stream of fluid, a plurality of spaced-apart, main, flow control vanes which are disposed between the laterally diverging walls of said conduit, said vanes dividing said conduit into a plurality of segments, each of which encompasses a divergence angle within the range of from 3° to 15°, and a pair of auxiliary, flow control vanes, one of which is located in each of the two outermost segments provided by said main, flow control vanes, the main, flow control vane located nearest the central axis of said flowing stream being flat, the other of said main, flow control vanes and both of said auxiliary, flow control vanes each having a section of predetermined surface curvature at the upstream end thereof and a flat section at the downstream end thereof, the control vanes on opposite sides of said flat vane being curved in opposite directions, and the curved and flat surfaces of the control vanes having curved sections being so disposed relative to each other that reaction forces in at least two planes at right angles to each other are produced on each of said vanes.

12. A stock supply system for a papermaking machine, comprising a stock supply conduit, means for establishing a flowing stream of stock under substantially steady-state conditions of flow within said stock supply conduit, a laterally-diverging, flow spreading conduit which connects with the outflow end of said stock supply conduit and which is operable to widen the flowing stream of stock delivered by said stock supply conduit, and means comprising a plurality of spaced-apart flow control members located within said flow spreading conduit for controlling the flowing stream of stock passing through said flow spreading conduit to obtain in that stream a substantially steady-state flow condition with substantially uniform pressure and velocity distribution across the width of the widened stream at the outflow end of said flow spreading conduit, said flow control members comprising a plurality of spaced-apart, main flow control vanes which are located adjacent the throat of the flow spreading conduit and which divide that conduit into a plurality of substantially iniformly dimensioned segments, each of which encompasses a divergence angle within the range of from 3° to 15°, and a pair of auxiliary, flow control vanes, one of which is located in each of the two outermost segments provided by said main, flow control vanes.

13. A stock supply system for a papermaking machine, comprising a stock supply conduit, means for establishing a flowing stream of stock under substantially steady-state conditions of flow within said stock supply conduit, a laterally-diverging, flow spreading conduit which connects with the outflow end of said stock supply conduit and which is operable to widen the flowing stream of stock delivered by said stock supply conduit, and means comprising a plurality of spaced-apart flow control members located within said flow spreading conduit for controlling the flowing stream of stock passing through said flow spreading conduit to obtain in that stream a substantially steady-state flow condition with substantially uniform pressure and velocity distribution across the width of the widened stream at the outflow end of said flow spreading conduit, said flow control members comprising a plurality of spaced-apart, flow control vanes disposed within said conduit in position to act upon said flowing stream of fluid, each of said flow control vanes having a curved-surfaced section at the upstream end thereof and a flat-surfaced section at the downstream end thereof which merges smoothly into said curved-surfaced section, at least one surface of the flat-surfaced section of each of a plurality of said vanes being angularly disposed relative to the surface defining elements of at least one surface of the adjoining curved-surfaced section, whereby reaction forces in at least two planes at right angles to each other are produced on each of a plurality of said vanes.

14. In flow control apparatus of the class described, means defining the walls of a laterally diverging conduit for containing a flowing stream of fluid, a plurality of flow control vanes, and means supporting said flow control vanes in spaced-apart relationship between the laterally diverging walls of said conduit, said vanes dividing said conduit into a plurality of segments, each of which includes a divergence angle within the range of 3° to 15°, each of said vanes having a curved section for imparting dynamic lift to those portions of the flowing stream of fluid which pass thereby, said support means including a spindle support for each of said flow control vanes, means engaging each of said spindles whereby each of said vanes can be individually rotated within predetermined limits, and an indexing connection between each of said spindle supports and said vane rotating means whereby said vanes can be removed from said conduit for cleaning and other purposes and replaced in position without loss of adjustment.

References Cited in the file of this patent

UNITED STATES PATENTS

| Number | Name | Date |
|---|---|---|
| 778,755 | Mathis | Dec. 27, 1904 |
| 1,175,069 | Mackey | Mar. 14, 1916 |
| 1,725,353 | Hinrich | Aug. 20, 1929 |
| 1,865,677 | Cheyney | July 5, 1932 |
| 1,997,387 | McCord | Apr. 9, 1935 |
| 2,020,034 | Knies | Nov. 5, 1935 |
| 2,144,035 | Smith | Jan. 17, 1939 |
| 2,158,413 | Feinberg | May 16, 1939 |
| 2,217,428 | Alben | Oct. 8, 1940 |

FOREIGN PATENTS

| Number | Country | Date |
|---|---|---|
| 177,186 | Switzerland | Nov. 16, 1935 |
| 509,287 | Great Britain | July 13, 1939 |
| 883,437 | France | Mar. 22, 1943 |